3,167,148
BATTERY HOLD DOWN CLAMP
William J. Hinch, Huntington Woods, Mich., assignor to Ford Motor Company, Dearborn, Mich., a corporation of Delaware
Continuation of application Ser. No. 861,901, Dec. 24, 1959. This application June 17, 1963, Ser. No. 289,167
2 Claims. (Cl. 180—68.5)

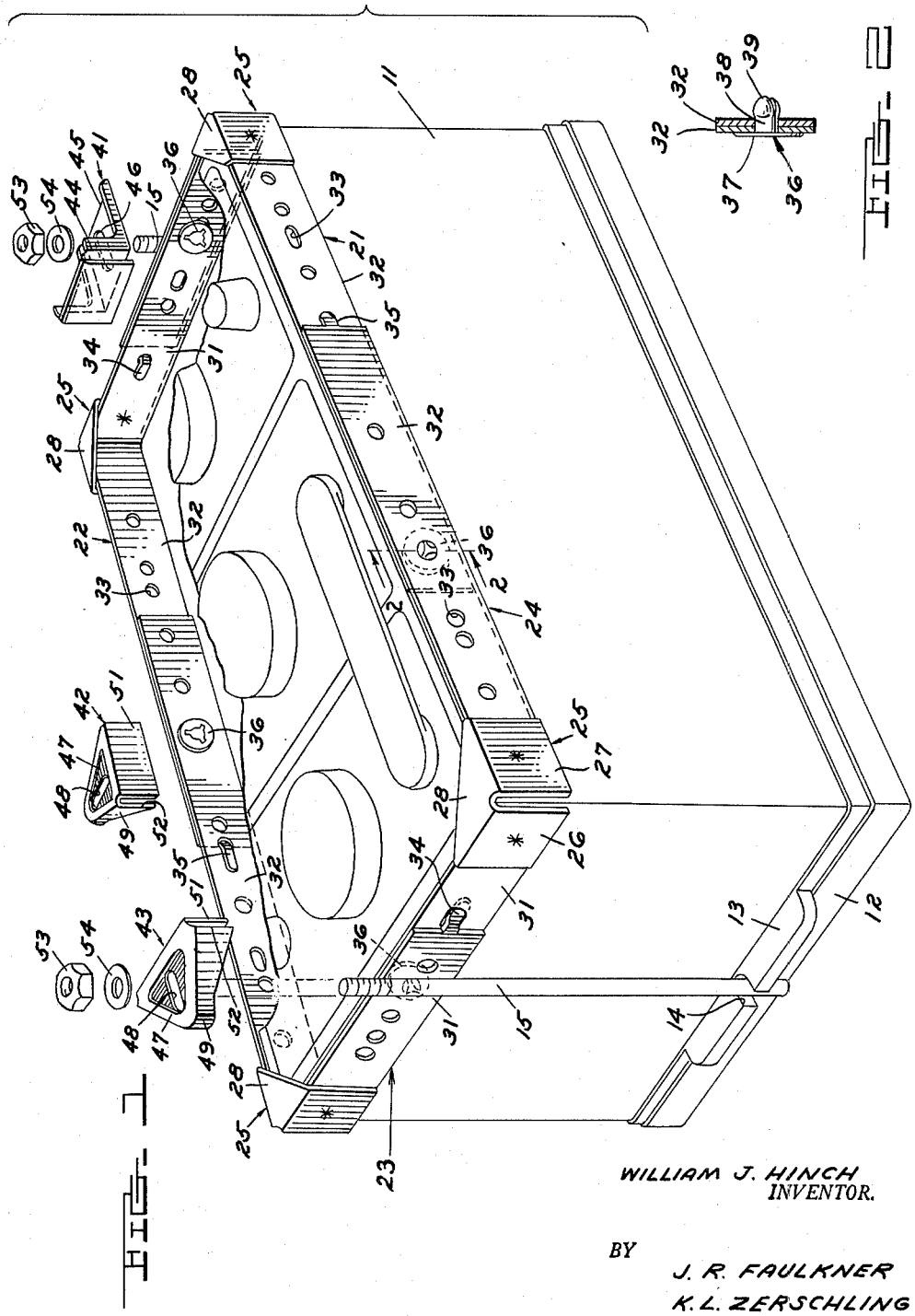

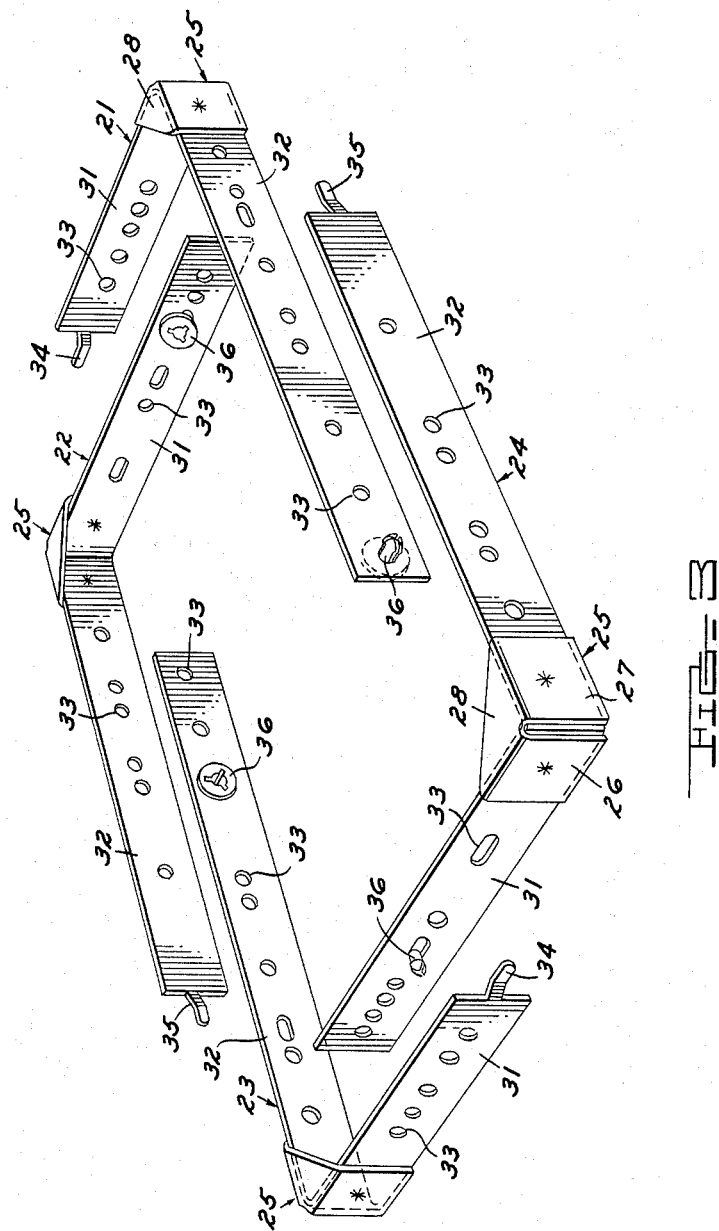

This invention relates to battery hold down clamps and more particularly to adjustable battery hold down clamps.

This application is a continuation of copending application Serial No. 861,901 and now abandoned, filed on December 24, 1959.

Present day battery manufacturers make a large variety of batteries which vary in length, width and height. Each manufacturer of batteries may have several sizes of batteries for each voltage rating. The size of the battery for each voltage rating usually increases for increased number of plates and an increased rating in ampere-hours. In the automotive industry, for example, a battery manufacturer may make four or five sizes of 12 volt batteries and one or two sizes of 6 volt batteries. Further, different manufacturers produce different size ranges so that a 12 volt battery having a given capacity produced by one manufacturer may have a different size than a 12 volt battery of the same capacity produced by another battery manufacturer. Additionally, different automobile manufacturers use different locations for the fastening means, such as hold down bolts, employed to secure a battery within an automotive vehicle.

With the great variety of battery sizes and with the great variety of locations for the hold down bolts, a large number of different sizes and kinds of hold down battery clamps must be manufactured to fit all the various batteries and all the various types of bolt arrangements. This presents a major problem to sellers of replacement batteries, since the replacement battery may be of different size than the original equipment battery, either because the replacement battery is of a different make, or because the customer requests a battery of a different capacity.

The present invention seeks to obviate the above-mentioned difficulty by providing an adjustable battery hold down clamp which will fit a variety of different batteries, and by providing a plurality of separate lugs which can be positioned in any position on the battery hold down clamp to engage the hold down bolts extending from the automotive vehicle no matter where the bolts are located around the periphery of the battery.

An object of the invention is the provision of an adjustable battery hold down clamp for an automotive vehicle battery which will fit a large variety of batteries.

Another object of the invention is the provision of an adjustable battery hold down clamp which can be employed with a large variety of different automotive vehicles.

Other objects and attendant advantages of the present invention will become more apparent as the specification is considered in connection with the accompanying drawings in which:

FIGURE 1 is a partly exploded perspective view of the present invention employed with an automotive vehicle battery;

FIGURE 2 is a cross sectional view partially in elevation taken along the lines 2—2 of FIGURE 1; and, FIGURE 3 is a perspective view of the present invention showing the individual sections of the battery hold down clamp.

Referring now to the drawings in which like reference numerals designate like parts throughout the several views thereof, there is shown in FIGURE 1 an automotive vehicle electrical storage battery 11 which rests upon a tray 12. The tray 12 may be affixed to the automotive vehicle frame or body by any suitable means which are well known in the art. The battery 11 has an integrally formed flange positioned at each end thereof, one of which is shown at 13. Each flange has a slot 14 positioned therein for the reception of bolts 15 which may be welded to the battery tray 12.

FIGURE 3 of the drawing shows a perspective view of the individual sections of the principal portion of the adjustable battery hold down clamp of the present invention. This figure of the drawing reveals that the invention comprises four generally L-shaped angle sections, designated by the numerals 21, 22, 23 and 24, which may conveniently be formed from straps of iron or steel. A cleat 25 comprising a pair of flanges 26 and 27 and a flat top portion 28 is provided for each L-shaped angle section. The cleats are affixed to the L-shaped angle sections at the corners thereof by any suitable means; for example, by spot welding the flanges to the legs of the angle sections as shown.

Each of the angle sections is provided with one relatively short leg 31 and one relatively long leg 32. All of the legs are provided with a plurality of apertures which are designated by the numeral 33. The relatively short legs 31 of the angle sections 21 and 23 are each provided with a tongue 34 extending from the end thereof which has a portion offset from the plane of these legs and the relatively long legs 32 of the angle sections 22 and 24 are each provided with a tongue 35 extending from the ends thereof which also has a portion offset from the plane of these legs. As can readily be appreciated by a study of FIGURE 3, the spacing of the apertures 33 in the leg 31 of angle section 21 is identical to the spacing of the apertures 33 in the leg 31 of angle section 23, while the spacing of the apertures 33 in the leg 31 of angle section 22 is identical to the spacing of the apertures 33 in the leg 31 of angle section 24. Similarly, the spacing of the apertures 33 in the leg 32 of angle section 21 is identical to the spacing in leg 32 of angle section 23, while the spacing of the apertures 33 in the leg 32 of angle section 22 is identical to the spacing of the apertures 33 in the leg 32 of angle section 24.

As can be seen by reference to FIGURES 1 and 2, the angle sections 21, 22, 23 and 24 can be combined to construct an adjustable battery hold down clamp which may have a variety of lengths and widths. To assemble the adjustable battery hold down clamp shown in FIGURE 1 from the angle sections shown in FIGURE 3, the tongue 34 on leg 31 of angle section 21 is placed through an aperture 33 in leg 31 of the angle section 22, and the tongue 34 on leg 31 of angle section 23 is placed through the corresponding aperture 33 in the leg 31 of angle section 24 so that the offset portions of the tongues engage the side of the legs positioned against the battery. The width of the adjustable battery hold down clamp is thus determined by the choice of the apertures 33 in legs 31 of angle sections 22 and 24 through which the tongues 34 on legs 31 of angle sections 21 and 23 are placed. Similarly, the length of the battery clamp is determined by placing the tongues 35 on legs 32 of angle sections 22 and 24 through the proper apertures in legs 32 of angle sections 21 and 23.

The apertures 33 in the legs of the angle sections are so spaced that when the tongues 34 and 35 of the legs are placed through certain of the apertures in the adjacent legs, as described above, at least one aperture in leg 32 of angle section 24 will be in alignment with an aperture in leg 32 of angle section 21. Similarly, apertures in the legs of the angle sections forming the other four sides of the battery hold down clamp are so spaced that at least one aperture in each of the overlapping legs will be in alignment.

A suitable fastening device, generally designated by the numeral 36, is employed, together with tongues 34 and 35, for fastening the overlapping legs of the angle sections together. As shown in FIGURES 1 and 2, this fastening device comprises a flat head 37 and a hollow split shank 38 having an enlarged end portion 39. This fastening device 36 is pushed through the aligned apertures in the overlapping legs of the angle sections from the inside of the battery clamp so that the flat heads 37 will be positioned against the battery 11. The split shank 38 of this fastening device has an outer diameter approximately equal to the diameter or width of the apertures 33 while the enlarged end portion 39 thereof has a diameter or width considerably larger than the diameter of the apertures. However, since the hollow shank, including the end portion, is split the enlarged end portion will be reduced in diameter as it is forced through the apertures 33 and will then expand to its original size to clamp the legs of the angle sections together. This can best be seen by reference to FIGURE 2 which shows the fastening device 36 clamping the legs 32 of angle sections 21 and 24 together. The fastening devices 36 are inserted through aligned apertures at points spaced from the tongues 34 and 35 to provide a rigid battery hold down clamp. As the heads 37 of the fastening devices 36 and the tongues 34 and 35 are relatively flush with the inside surface of the assembled battery hold down device, undue stresses on the periphery of the cap of the battery 11 are minimized, thus prolonging the life of the battery.

When the device is assembled to the proper size to fit the battery 11, it is placed over the battery so that the flat top portions 28 of the cleats 25 fit over he corners of the battery. A plurality of lugs, generally designated by the numerals 41, 42 and 43, are provided with the adjustable battery hold down clamp. The lug 41 is provided with a generally U-shaped section 44 which fits over the overlapping legs of the angle sections as indicated. This lug has a flange 45 extending therefrom which contains an aperture 46 for reception of bolt 15. As can readily be appreciated by an inspection of FIGURE 1, the plane of the flange 45 will be below the top of the battery 11 when the lug is properly positioned upon the overlapping legs of the adjustable battery hold down clamp. This type of lug may therefore be used with certain automotive vehicles in which engine components are positioned closely above the end of battery 11.

Lugs 42 and 43 are identical and comprise a top flange 47 having an aperture 48 for the reception of bolts 15. The flange 47 has depending side flanges 49 and a back depending flange 51 formed integrally therewith. The edges 52 of the side flanges are spaced from the back flange by an amount equal to the thickness of two of the legs of the angle sections. The lugs 42 and 43 can thus be positioned over the overlapping legs of the angle sections, as indicated, so that the back flanges 51 thereof are positioned between the battery and the legs of the angle sections and so that the top flanges 47 are positioned approximately even with the top of the battery 11.

When it is desired to clamp a battery in place in an automotive vehicle, the adjustable battery hold down clamp is assembled to proper size to fit the battery. The assembled adjustable battery hold down clamp is then positioned over the top of the battery so that the flat portions 28 of the cleats 25 engage the corners of the top of the battery. Any two of the three lugs, depending upon which ones are suitable, are positioned over the legs of the clamp so that the bolts 15 extend through the apertures 46 or 48 in the top flanges 45 or 47 as the case may be. A nut and washer 53 and 54 are then employed to secure the lugs securely to the bolts 15. Thus, the adjustable battery hold down clamp is firmly positioned against the top of the battery and the battery is firmly secured in its tray 12.

Alhough the bolts 15 are shown positioned at the ends of the battery, it can readily be appreciated that the invention may be employed if the bolts are positioned at the sides of the battery or in any other suitable position around the periphery of the battery.

It can be noted that the snap-in fastening devices 36 and the offset tongues 34 and 35 permit the quick assembly of the four angle sections 21, 22, 23 and 24 to provide a rigid battery hold down clamp which can be employed with a wide range of battery sizes. Further, the battery hold down clamp of this invention can be readily readjusted to fit different sizes of replacement batteries and be utilized to mount these batteries in a wide variety of makes and models of automotive vehicles.

It will be understood that the invention is not to be limited to the exact construction shown and described, and that various changes and modifications may be made without departing from the spirit and scope of the invention, as defined in the appended claims.

What is claimed is:

1. In combination, a vehicle structure, at least one pair of bolts, each bolt having one end secured to said vehicle structure, a storage battery positioned on a portion of said vehicle structure, and a rectangular adjustable battery hold down clamp for securing said storage battery to said vehicle structure, said battery hold down clamp comprising four rigid angle sections, each of said angle sections having one relatively long leg and one relatively short leg and having a cleat positioned over the corner thereof, said cleat having a pair of flanges affixed to the legs of the angle section, said angle sections being arranged so that the relatively long legs overlap each other and so that the relatively short legs overlap each other, each of said legs having a plurality of spaced apertures positioned therein, a first tongue extending from each end of the relatively long legs of one pair of oppositely disposed angle sections, a second tongue extending from each end of the relatively short legs of the other pair of oppositely disposed angle sections, the first tongues extending from the relatively long legs of the one pair of oppositely disposed angle sections fitting through selected apertures in the overlapping relatively long legs of the other pair of oppositely disposed angle sections, the second tongues extending from the ends of the relatively short legs of the other pair of oppositely disposed angle sections fitting into selected apertures in the overlapping relatively short legs of said one pair of oppositely disposed angle sections, snap-in fastening means extending through aligned apertures in adjacent overlapping legs and spaced inwardly from each of said first tongues and second tongues respectively to clamp said overlapping legs together, and at least two lugs, each lug having a horizontally extending flange with an opening therein, said flange integrally formed with an inverted U-shaped portion to fit said overlapping angle sections, the U-shaped portions being positioned over overlapping angle sections so as to axially align the openings in said flanges with said pair of bolts, said openings securely receiving the other ends of said pair of bolts to attach said storage battery to said vehicle structure.

2. In combination, a vehicle structure, at least one pair of bolts, each bolt having one end secured to said vehicle structure, a storage battery positioned on a portion of said vehicle structure, and a rectangular adjustable battery hold down clamp for securing said storage battery to said vehicle structure, said battery hold down clamp comprising four rigid angle sections, each of said angle sections having one relatively long leg and one relatively short leg and having a cleat positioned over the corner thereof, said cleat having a pair of flanges affixed to the legs of the angle section, said angle sections being arranged so that the relatively long legs overlap each other and so that the relatively short legs overlap each other, each of said legs having a plurality of spaced apertures positioned therein, a first tongue extending from each end of the relatively long legs of one pair of oppositely disposed angle sections, a second tongue extending from each end of the relatively short legs of the other pair of oppositely disposed angle sections, the first tongues extending from the relatively long legs of the one pair of oppositely disposed angle sections fitting through selected apertures in the overlapping relatively long legs of the other pair of oppositely disposed angle sections, the second tongues extending from the ends of the relatively short legs of the other pair of oppositely disposed angle sections fitting into selected apertures in the overlapping relatively short legs of said one pair of oppositely disposed angle sections, fastening means extending through aligned apertures in adjacent overlapping legs and spaced inwardly from each of said first tongues and second tongues respectively, each fastening means having a flat head and a retention means, said retention means comprising a split shank having an enlarged end portion, said end portion being resiliently compressible through aligned apertures in said angle sections, said end portion upon projecting through said aligned apertures expanding to its original free dimension thereby clamping said overlapping angle sections together, and at least two lugs, each lug comprising a top flange provided with an opening, said top flange integrally formed with dependent flanges defining a slot therebetween, said slot fitting over overlapping angle sections, said openings in the top flanges of said lugs securely receiving the other ends of said pair of bolts to hold said storage battery in said vehicle structure.

References Cited by the Examiner
UNITED STATES PATENTS

| | | | |
|---|---|---|---|
| 874,014 | 12/07 | Kurtzon | 248—243 |
| 1,247,938 | 11/17 | Curtenius. | |
| 1,458,280 | 6/23 | Dooley | 180—68.5 |
| 1,743,904 | 1/30 | Russell | 280—35 |
| 2,041,336 | 5/36 | Hall | 248—361 |
| 2,214,388 | 9/40 | Summers. | |
| 2,216,663 | 10/40 | Fogle | 180—68.5 |
| 2,316,389 | 4/43 | Atkinson. | |
| 2,326,481 | 8/43 | Meyer | 180—68.5 |

A. HARRY LEVY, *Primary Examiner.*